(12) United States Patent
Johansson et al.

(10) Patent No.: US 7,864,814 B2
(45) Date of Patent: Jan. 4, 2011

(54) CONTROL MECHANISM FOR ADAPTIVE PLAY-OUT WITH STATE RECOVERY

(75) Inventors: Ingemar Johansson, Luleå (SE); Tomas Frankkila, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 126 days.

(21) Appl. No.: 12/092,884

(22) PCT Filed: Nov. 7, 2005

(86) PCT No.: PCT/EP2005/055788

§ 371 (c)(1),
(2), (4) Date: May 7, 2008

(87) PCT Pub. No.: WO2007/051495

PCT Pub. Date: May 10, 2007

(65) Prior Publication Data

US 2008/0285599 A1    Nov. 20, 2008

(51) Int. Cl.
*H04J 3/06* (2006.01)
(52) U.S. Cl. ...................... 370/508; 375/232
(58) Field of Classification Search ................ 370/458, 370/503, 508; 375/232, 229
See application file for complete search history.

(56) References Cited

U.S. PATENT DOCUMENTS

| | | | |
|---|---|---|---|
| 5,991,339 A * | 11/1999 | Bazes et al. | 375/232 |
| 6,721,327 B1 | 4/2004 | Ekudden et al. | |
| 6,873,954 B1 | 3/2005 | Sundqvist et al. | |
| 7,191,355 B1 * | 3/2007 | Ouellette et al. | 713/400 |
| 7,502,733 B2 * | 3/2009 | Andrsen et al. | 704/211 |
| 2003/0043856 A1 | 3/2003 | Lakaniemi et al. | |
| 2004/0156397 A1 | 8/2004 | Keikkinen et al. | |
| 2005/0058145 A1 | 3/2005 | Florencio et al. | |

FOREIGN PATENT DOCUMENTS

| | | |
|---|---|---|
| EP | 1288916 A2 | 3/2003 |
| WO | WO 01/18790 A1 | 3/2001 |
| WO | WO 01/93516 | 12/2001 |

OTHER PUBLICATIONS

Serizawa, M, et al. "A packet loss recovery method using packet arrived behind the playout time for CELP decoding" 2002 IEEE Int'l Conf on Acoustics, Speech and Signal Processing Proceedings, (ICASSP). Orlando, FL. May 13-17, 2002 vol. 4 of 4 pp. I-169/I-172 ISBN:0-7803-7402-9.

* cited by examiner

*Primary Examiner*—Phuc Tran

(57) ABSTRACT

A control logic means preferably for a receiver comprising a jitter buffer means adapted to receive and buffer incoming frames or packets and to extract data frames from the received packets, a decoder connected to the jitter buffer means adapted to decode the extracted data frames, and a time scaling means connected to the decoder adapted to play out decoded speech frames adaptively. The control logic means comprises knowledge of whether a state recovery function is available and is adapted to retrieve at least one parameter from at least one of the jitter buffer means, the time scaling means, and the decoder, to adaptively control at least one of an initial buffering time of said jitter buffer means, the knowledge of the availability of the state recovery function, and a time scaling amount of said time scaling means from the time scaling means or the decoder.

24 Claims, 5 Drawing Sheets

CONTROL MECHANISM FOR ADAPTIVE PLAY-OUT WITH STATE RECOVERY

FIELD OF THE INVENTION

The present invention relates generally to packet-based communication system suitable for transmission of sound signals, and more particularly to buffering techniques for use in such communication systems.

BACKGROUND

Voice over IP is a convergence between the telecom and datacom world, wherein the speech signals are carried by the data packets, e.g. Internet Protocol (IP) packets. The recorded speech is encoded by a speech codec on a frame-by-frame basis. A data frame is generated for each speech frame. One or several data frames are packed into RTP packets. The RTP packets are further packed into UDP packets and the UDP packets are packed into IP packets. The IP packets are then transmitted from the sending client to the receiving client using an IP network.

A problem associated with packet based networks is delay jitter. Delay jitter implies that even though packets are transmitted with a regular interval, for example one frame every 20 ms, the packets arrive irregularly to the receiver. Packets may even arrive out of order. The most common reasons for receiving packets out-of-order is because the packets travel different routes, at least for fixed networks. For wireless networks, another reason may be that re-transmission is used. For example: When sending packet N on the uplink (i.e. from the mobile terminal to the base station) there may be bit errors that cannot be corrected and re-transmission has to be performed. However, the signaling for retransmissions may be so slow that the next packet in the queue (packet N+1) is sent before packet N is re-transmitted. This may result in that the packets are received out-of-order if packet N+1 was correctly received before the re-transmitted packet N is correctly received.

In VoIP clients, a jitter buffer means is used to equalize delay jitter in the transmission so that the speech samples can be played out at a constant sampling rate, for example one frame every 20 ms. (Play out is in this description used to indicate the transmission of the speech to the sound card.) The fullness level of the jitter buffer means is proportional to the amount of the delay jitter in the packet flow and the objective is to keep the amount of late losses at an acceptable level while keeping the delay as low as possible. The following example explains the importance of keeping the delay as low as possible: Long buffering time in the jitter buffer means increases the end-to-end delay. This reduces the perceived conversational quality because the system will be perceived as "slow". Long delays increases the risk of that the users talk at the same time and may also give the impression that the other user is "slow" (thinking slowly). Further, a late loss is a packet that is properly received but that has arrived too late to be useful for the decoder.

The jitter buffer means stores packets or frames for a certain time. A typical way of defining this is to say that the jitter buffer means is filled up to a certain "level", denoted the fullness level. This level is often measured in milliseconds instead of the number of frames since the size of the frames may vary. Thus the jitter buffer means level is measured in time. The jitter buffer means level can be set in a number of different ways.

Fixed size: The fixed size implies that the jitter buffer fullness level is fixed and pre-configured. After a DTX period, the jitter buffer means is initially filled up with a fixed time e.g. a fixed number of frames (e.g. 5 frames) before speech play-out is resumed. This initial margin is used to give a protection against delay jitter and late loss.

Adaptive jitter buffer means size: The jitter buffer fullness level varies with the delay jitter. Similarly to the case of fixed size of the jitter buffer fullness level, an initial number of frames are buffered up before speech play-out is resumed after a DTX period. However, during the active voice (non-DTX) period the fullness level of the jitter buffer means may vary, based on analysis of the incoming packets. It is possible to collect the statistics over several talk spurts. However, one usually reset the jitter buffer fullness level to the "default level" at every speech onset.

Adaptive jitter buffer means size with improved interactivity: In order to reduce the perceived delay, it is possible to initialize the jitter buffer means with a shorter time than for case with adaptive jitter buffer means size and the speech play-out is started as soon as the first speech packet is received after DTX. In order to reach the jitter buffer fullness level, time scaling is used to stretch the initial decoded frames so that the packets are extracted from the jitter buffer means at a reduced pace. Time scaling implies that the speech frames are played out adaptively, i.e., that a speech frame that normally contains 20 msec of speech may be stretched and 30 msec of speech is generated. An alternative to start play-out after the first received packet is to wait one or two extra packets. WO-200118790 A1 and US2004/0156397 A1 describe time scaling.

DTX is discontinuous transmission and implies that a special type of information is transmitted on the channel when no voice is present and the input signal contains only (background) noise. The encoder evaluates the background noise and determines a set of parameters that describes the noise (=Silence Description, SID, parameters). The SID parameters are transmitted to the receiving terminal so that a similar noise, comfort noise, can be generated. The SID parameters are transmitted less frequently than normal speech frames in order to save power and transmission resources.

Turning now to FIG. 1 showing an example of initial jitter buffer means operation according to the method of the adaptive jitter buffer means size with improved interactivity. The upper plot shows the jitter buffer fullness level and the lower plot shows frame size. The play-out is started as soon as the first packet is received, at about 0.5 seconds. Time scaling is performed to increase the size of the generated frames and thereby consume frames at a slower than normal pace from the jitter buffer means. The early start of the play-out gives a feeling of improved interactivity which increases the perceived conversational quality. In the end of the talk-burst, at about 3 seconds, the last speech frames are shortened and played out at a faster pace than normally. This gives a further improved interactivity.

Note that the adaptation of the target jitter buffer means level (60 ms) during the non-DTX period is not shown in FIG. 1, however this functionality will exist in a typical implementation of the adaptive jitter buffer means size with improved interactivity.

There are however several drawbacks with the three methods described above. The fixed jitter buffer means size, gives a quite long delay since a number of packets are always buffered before the play-out starts. This reduces the perceived interactivity.

The adaptive jitter buffer means may adjust the fullness level in order to introduce less delay on average, at least if the channel is varying slowly. The problem with poor interactivity due to long initial buffering time still remains since the purpose with the adaptation is to adapt within an ongoing packet flow during active speech when the flow starts up after a DTX period. It should be noted that this problem occurs if the jitter buffer fullness level is reset to a default level at every speech onset (i.e. at the switching from DTX to speech).

The jitter buffer means initialization, when using the adaptive jitter buffer means size with improved interactivity, improves the interactivity as the perceived initial delay will be lower. One problem is however that the jitter buffer means level is very low in the beginning of a speech burst and there is therefore a risk that delay jitter in the beginning of speech bursts results in late losses. Similarly to frame losses, late losses will reduce the speech quality since the error concealment is activated for the frame that is lost or is received late.

Additionally, the method of the adaptive jitter buffer means size with improved interactivity also implies that the time scaling, to adjust the buffer level up to the normal fullness level, must be done quite fast since the adaptation period must be short enough to avoid being hit by multiple delay spikes. A delay spike is when the delay increases substantially from a first packet to a subsequent packet. This means that the time scaling must be quite aggressive. Aggressive time scaling increases the risk that the time scaling itself introduces distortions. The distortions may be of different kind, clicks, plops, bursts of noise, but also "funny sounding sound" like "unnatural talking amount".

For most modern speech codecs (GSM-EFR, GSM-AMR, ITU-T G.729, EVRC, etc), that use inter-frame prediction to be able to encode the signal at a lower bit rate but with maintained quality, there is an additional problem. Both frame losses and late losses give distortions for the current frame and also for subsequent frames since the error propagate for some time due to the inter-frame prediction. The error propagation time depends on the sound and the codec but may be as long as 5-6 frames (100-120 ms). Late losses are especially critical in the beginning of speech burst as these parts often contain voiced onsets, which are later used by the adaptive codebook to build up the voiced waveform. The result of a late loss in the beginning of a speech burst is therefore often very audible and can degrade intelligibility considerably.

There are a few methods to compensate for the error propagation that would occur if a late loss occurs during the build-up time, but they all have significant drawbacks. One possibility is to reduce initial buffering time but not as much as could be done in the optimum case. This would, of course, mean that it is not possible to benefit that much, in terms of interactivity, as it would be desired to.

Another possibility is to reduce of the amount of inter-frame prediction used in the codec. This would however either result in a reduced intrinsic speech quality, since the inter-frame correlation is not exploited to its full potential, or require that the signal is encoded at a higher bit rate, or both.

Due to the drawbacks with the method of adaptive jitter buffer means size with improved interactivity, the method is difficult to use in real systems. For channels that contains very little jitter and preferably also few packet losses it may work well but for channels that contains a lot of jitter and possibly also gives packet losses it is very difficult to get the full gain in improved interactivity. For most practical cases, it would be preferable to have an initialization time of a few frames before the play-out starts.

SUMMARY

An object of the present invention is to achieve control logic means that improves the interactivity and/or the speech (listening) quality.

The above stated object is achieved by a control logic means and a method according to the independent claim.

Preferred embodiments are defined by the dependent claims.

This invention is based on the possibility to adaptively control at least one of the initial buffering time and time scaling amount to improve the interactivity and/or the speech and listening quality.

That is achieved by introduction of a control logic means that is adapted to retrieve information from at least one of the jitter buffer means, decoder, and the time scaling means and the state recovery means, the control logic means is further adapted to adaptively control the at least one of the initial buffering time and time scaling amount based the retrieved information.

Thanks to the introduction of the control logic means, it is possible to improve the advantage of the state recovery means in combination with the initial buffering time. State recovery makes the receiver less sensitive to late losses during the initial jitter buffer means build-up period. It is therefore possible to have very short initialization time, by having an aggressive time scaling. This improves the interactivity even further than what is possible with the method of adaptive jitter buffer means size with improved interactivity.

Since the robustness against late losses is increased by means of the state recovery, a longer jitter buffer means build up period can also be allowed. It is therefore possible to do less aggressive time scaling. This may be advantageous, since time scaling may introduce distortions in the synthesized speech due to the performance of the time scaling is different for different sounds.

Since the control logic means is able to combine the initial buffering time, state recovery and time scaling in different ways, an adaptation between these variants improves the performance. This adaptation may be based on either the current channel conditions or the sound signal or both.

The use of time scaling and state recovery results in an increased complexity, and hence in a higher Central Processing Unit (CPU) load. A further advantage with the present invention is that it enables control of the complexity by controlling parameter settings and enabling/disabling of the state recovery. That is achieved by the control logic means that retrieves information regarding the CPU load and controls the parameter settings or enabling/disabling of the state recovery means. The retrieved information regarding to the CPU load may be associated with time scaling operations and/or state recovery operations.

The listening quality is improved as the improved interactivity gives a lower perceived delay and state recovery improves the quality as the possible late losses due to the aggressive use of time scaling are repaired.

Another advantage is that the control logic means allows for adapting to different operating conditions, such as good channel conditions in an office LAN having only occasional delay spikes and short delays or bad channel conditions in a heavily loaded cellular network having large jitter and possibly also packet losses and long delay.

BRIEF DESCRIPTION OF THE DRAWINGS

The objects and advantages of this invention will be apparent from reading this description in conjunction with the drawings, in which.

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
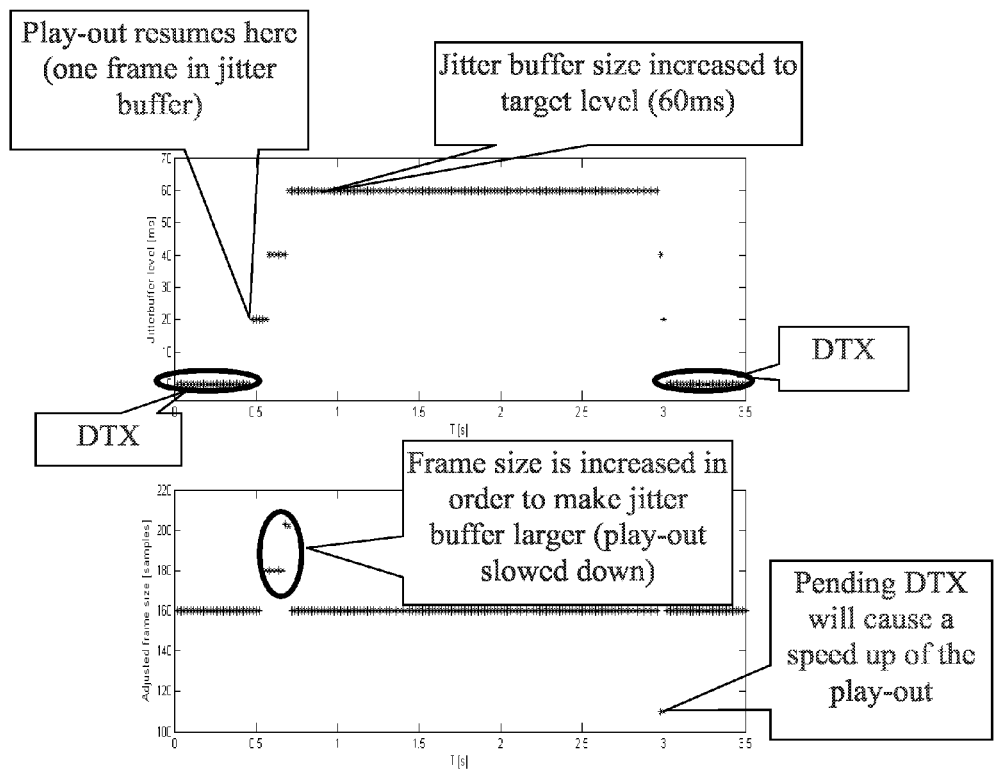
FIG. 1 is a graph showing the operation of the time scaling functionality.
Figure 2:
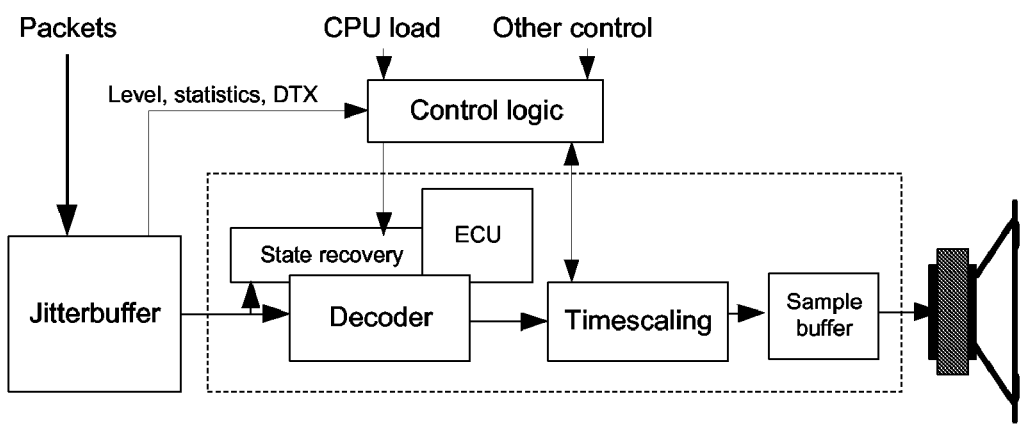
FIG. 2 shows the control logic means in a receiver according to the present invention.

An overview of a receiver for a Voice over IP client is shown in FIG. 2. It should be noted that the present invention may also be applicable to Voice over ATM without IP and other systems where delay jitter occurs. The receiver comprises a jitter buffer means connected to a decoder and the decoder is further connected to a time scaling means. A state recovery means in connection with an Error Concealment (ECU) means may be connected to the jitter buffer means and the decoder. The receiver receives data packets via the jitter buffer means. The packets are unpacked, as the packets may contain data for several speech data frames, if so, this is indicated in the packet payload header. Thus the jitter buffer means is adapted to extract the data frames from the packets. As the data frames may be re-ordered due to delay jitter, the jitter buffer means places the frames in order. From the jitter buffer means it is possible to get information about late losses, frame losses and the current jitter buffer means level. It should be noted that the extraction of data frames may also be performed in another means and the jitter buffer means receives then the data frames.

The decoder decodes the data frames into speech frames i.e. into a sound signal. For instance as in the AMR 12.2 kbps mode where the data frames are 244 bits, they are decoded into 160 16-bit words samples (speech frame).

The time scaling means has the ability to compress or expand the size of the decoded speech frames coming from the decoders, for instance the 160 samples from the speech decoder can be expanded to 240 samples or compressed to 80 samples or expanded/compressed to some other frame size. The time scaling means provides information regarding the achieved compression or expansion. Time scaling performs differently for different sound signals. Some sound signals are quite easy to scale in time and time scaling then introduces no or little distortions. Examples of such sounds are stationary voiced segments, unvoiced segments and background noise. Other sound signals are quite hard to scale in time and then time scaling would probably introduce quite audible distortions. Examples of sounds that are difficult to scale are transient sounds (that goes from unvoiced to voiced), plosives ("t", "p", "b", ... ), speech onsets (that goes from background noise (DTX) to speech). Therefore, it is desired to retrieve information from either the speech decoder or the time scaling function to be able to decide how aggressive the time scaling should be. Other examples of different parameters or measures that describe sound properties or channel characteristics and that are desired to retrieve, alone or in combination, to adapt the initial buffering time or the time scaling amount are adaptive codebook (ACB) gain, fixed codebook (FCB) gain, LTP/ACB lag measures and characteristics, LSP coefficients characteristics, spectral flatness measure, spectrum variations, energy measures and variations.

Examples of different methods for performing time scaling that may be used in the present invention are described in the patent application WO 01/93516 and in the U.S. Pat. No. 6,873,954. It should be noted that the above mentioned time scaling means may also be located in the transmitter, and the time scaling may thus be performed before the encoding operation. If the time scaling is performed in the transmitter, some information must be exchanged between the encoder and decoder.

The decoding means and the time scaling means may also be integrated into one unit. In such an integrated unit, the time scaling is performed on the excitation before the synthesis filter and then apply the synthesis filter on more or less samples than in the normal case.

The time scaling means is further connected to a sample buffer. The time scaled frames are transferred to the sample buffer. One or a plurality of samples, wherein a frame is a plurality of consecutive samples, are sent from the sample buffer to the sound card of the speaker as long as the sample buffer is filled to a pre-defined threshold level. If the sample buffer is not filled, further decoding operations are requested. Therefore, the introduction of time scaling is possible.

According to the present invention, a control logic means is introduced to retrieve information such as knowledge about existing state recovery function, channel characteristics, sound properties, caused distortion (comparison of distortion before and after time scaling) and the achieved time scaling. Information about existing state recovery function can pre-configured in the control logic means or information about enabling/disabling of a state recovery means may be fetched from the state recovery means. Channel characteristics can be fetched from the jitter buffer means, sound properties and distortion information can be fetched from the decoder, distortion information and achieved time scaling can be fetched form the time scaling means. Thus the control logic means is required to have knowledge whether a state recovery function is available and the control logic means is adapted to retrieve information from at least one of the jitter buffer means, the state recovery means, the decoder and the time scaling means. The control logic means may also be used to control the jitter buffer fullness level.

The control logic means is then adapted to adaptively control at least one of the initial buffering time of the jitter buffer means based on the retrieved information from the jitter buffer means and the knowledge of the availability of the state recovery function and the time scaling settings of the time scaling means based on the retrieved information from the time scaling means or the decoder in combination with the knowledge of the availability of the state recovery function. The control logic means is preferably adapted to perform this controlling per frame basis.

The state recovery means provides a state recovery function. The state recovery function repairs late losses and improves pure error concealment. The function is described in the U.S. Pat. No. 6,721,327 B1.

When a frame is not received, either because it is lost or is not received in time (i.e. received too late), the error concealment means will be activated to try to conceal the error. However, by using the error concealment erroneous start-up states for the subsequent frame are provided. A frame that is received but not in time to be useful for the synthesis is still usable to correct the states at the frame boundaries, before the subsequent frame is decoded and synthesized. This is done according to the state recovery method by performing an additional decoding using decoder states that are reverted back to the state before the late loss. The decoding is done using the correctly received parameters resulting in a corrected decoder state. The audio samples from the additional decoding are discarded as they are too late to be played out. The states after the error concealed frame are either replaced by or combined with the states from the additional decoding to create improved states that are more suitable for the subsequent frame. This results in that the error propagation time is reduced.

Figure 3:
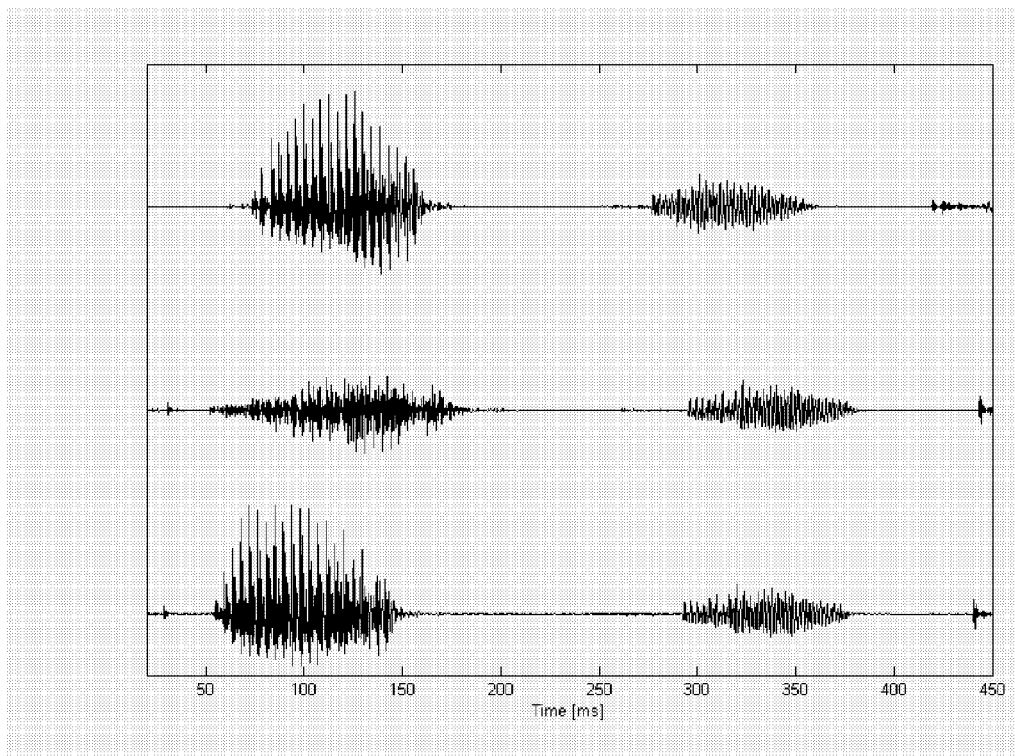
FIG. 3 is graph illustrating the improved performance with state recovery.

State recovery improves the performance even if a multiple consecutive late losses occurs, however due to decoding complexity constraints it will be preferable to use state recovery in an implementation to only handle single or very few late losses which does not result in a decoder complexity overload (which in turn results in a CPU overload). FIG. 3 shows the advantage that the state recovery gives. The upper graph of FIG. 3 disclose an undistorted wave form, the middle wave form is distorted by late losses and the lower waveform is distorted by late losses but repaired by state recovery. It should be noted that the waveforms and timing differs slightly as the time scaling is involved. It can then be seen that the speech in the middle graph is attenuated and distorted over a longer period of time which results in a bad speech quality. Thus, the state recovery improves the performance by making the system more robust against late losses but increases the decoding complexity by the required additional decoding.

The method and arrangements of the present invention improves the perceived speech quality during the jitter buffer means build-up phase. The improved jitter buffer means build-up phase is described in FIGS. 4 to 6.

Figure 4:
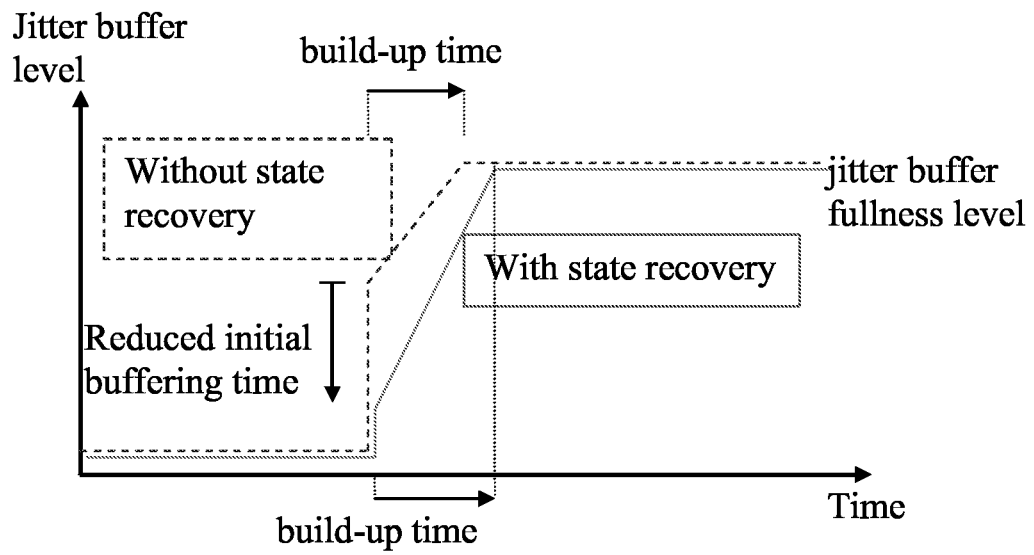
FIG. 4-6 shows the functionality of the improved jitter buffer means build-up according to the present invention.
Figure 5:
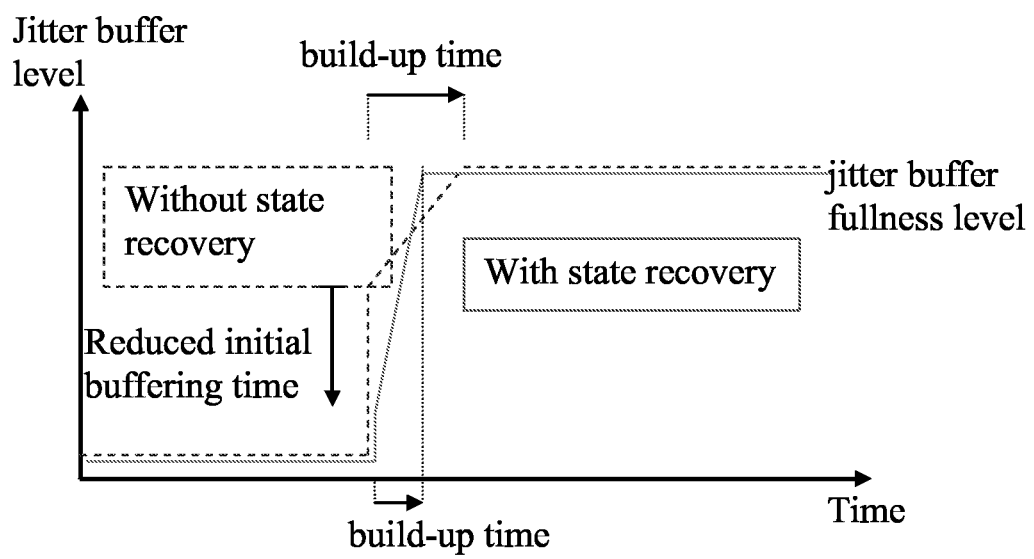
Figure 6:
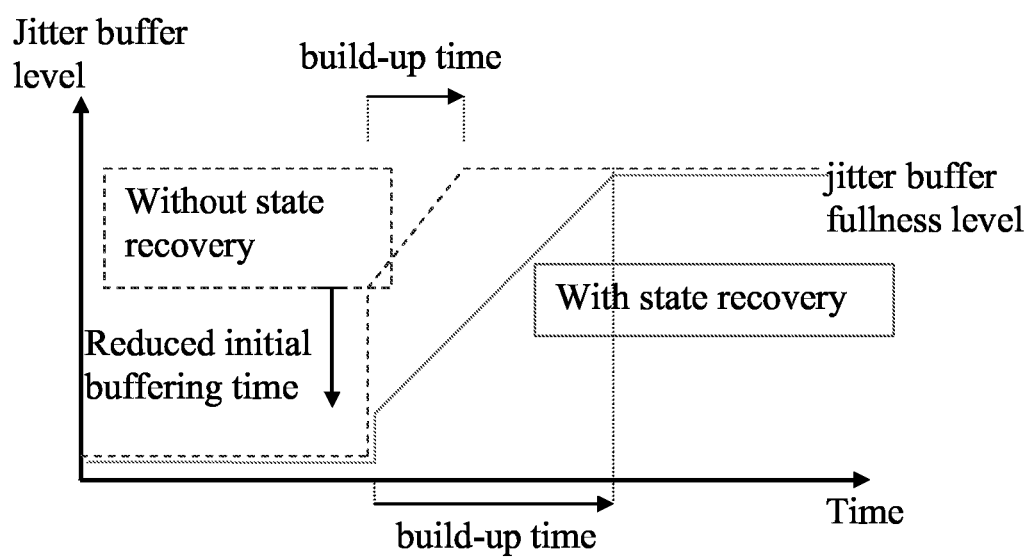

The graph in FIGS. 4-6 shows the jitter buffer means level on the vertical axis and the time on the horizontal axis. The initial buffering time, the build-up time and the fullness level are indicated. The initial buffering time is the time (or size of the received frames in the buffer) before the frames are transferred further to the decoder and the build-up time is the required time to reach the jitter buffer fullness level. In FIG. 4, the dashed line shows the jitter buffer fullness level for the method of buffer with improved interactivity. The solid line shows the jitter buffer fullness level with the method according to the present invention, wherein the control logic means controls the initial buffering time and time scaling amount that affects the build up time. This control is based on the late loss probability during the build up time and the existence of state recovery.

State recovery enables further reduction of the initial buffering time since the state recovery makes the receiver more robust to late losses. The control logic means according to the present invention enables adaptation of the reduced initial buffering time based on the existence/non-existence of state recovery. Since it is possible to reduce the initial buffering time even further the perceived interactivity is further improved than what is performed in prior art.

How well the time scaling works, depends on the sound properties of the decoded speech frames as described above. For some sounds the time scaling introduces distortion and for some sounds, the time scaling works very well. An analysis of the sound property may be used by the control logic means according to the present invention to decide how aggressive time scaling should be, i.e. to adapt the time scaling to the current situation. A very aggressive time scaling makes it possible to have a very short jitter buffer means build-up period, which reduces the risk of being hit by the delay spike. An aggressive time scaling is illustrated in FIG. 5. The short build up time is beneficial since the state recovery is an error concealment method and gives better, but not perfect, states, which implies that late losses still may impact the performance. If the channel has severe delay jitter characteristics and if state recovery is not available, then it is required to use a very aggressive time scaling amount to increase the content in the jitter buffer means very rapidly. If state recovery is available, then the aggressiveness can be controlled depending on how good the time scaling performs for the current speech segment. For the sounds where the time scaling does not work that well, the control logic means will trigger a less aggressive time scaling, which gives a longer build-up time. Examples of different parameters or measures that describe how good time scaling performs and that the control logic means may use alone or in combination with other parameters/measures to control the time scaling aggressiveness are spectrum error, energy differences and pitch matching error between the signal before and after time scaling operation. This is illustrated in FIG. 6. In this case, the control logic means can preferably enable the state recovery function to reduce the impact of late losses.

Since both the channel properties and the speech signal vary over time, it is beneficial to have a control logic means that adapts between the above mentioned jitter buffer means build-up strategies illustrated in FIGS. 4-6. Further, if the channel is varying rapidly, then it is beneficial to have a short build-up period since this reduces the risk of being hit by one or several delay spikes. This means that statistics of the channel behavior must be collected e.g. from the jitter buffer means, so that the statistics can be used by the control logic means in order to adapt the time scaling amount, thereof.

State recovery introduces extra decoding complexity, which results in a higher CPU load, since additional decoding operations are performed. The extra decoding operations are required since the decoder state is reverted to the assumed state before the late loss and decoding is done using the correctly received but delayed parameters. The number of extra decoding operations is proportional to how late the late frame is. If the frame is late by one frame, one extra state decoding is needed. In order to reduce the complexity it is not necessary to run the synthesis filter and post filter. The synthesis filter and post-filter states are therefore not recovered. This is possible as the objective of the state recovery is only to recover states that otherwise take a long time to repair without state recovery. This covers the parts that are involved in the update of the adaptive codebook (pitch gain, pitch lag, fixed codebook gain, fixed codebook). This means that the complexity increased is roughly halved.

An extra ECU decoding is needed to avoid the discontinuity between the previous error concealed frame and the newly decoded good frame that is decoded using the recovered decoder state. An overlap period of about 5 to 20 ms is needed to give a smooth transition between the two decoded signals (overlap-and-add). Thus the state recovery increases the decoding complexity and hence the CPU load. Therefore, there may be cases where the total complexity may reach beyond what the CPU can handle. It is therefore necessary to control the decoding complexity and the CPU load accordingly. The control logic means according to one embodiment of the present invention is adapted to retrieve information regarding the CPU load in order to know when the state recovery means should be enabled/disabled due to the CPU load.

Furthermore, the use of time scaling also introduces increased complexity and hence increased CPU load. The control logic means may monitor the total complexity used by the time scaling means, and adjust the complexity used by the state recovery means. E.g., if it is found that the time scaling means is using a lot of resources the state recovery can be limited to a fewer number of parameters, or performed with a lower resolution. Alternatively one can reduce the overlap length in the synthesis mixing operation. The control logic means may even adjust the speech parameters used in normal decoding to simplify the synthesis step. (e.g. force the use of integer pitch lags, or even totally shut down the ACB-excitation extraction).

With a tight control of the complexity usage for the different receiver parts, the receiver parts may use its cycles where they are most needed to provide the highest interactivity possible within a given minimum speech quality and a given maximum complexity allowance. This control is useful for strictly cycle limited embedded systems, for example within a cellular platform. It should be noted that the complexity limitations may be equally limited in the system, e.g. in the Media Gateway (MGW). Thus the retrieved CPU load related information may also concern the MGW CPU load, or another system CPU load.

Thus, the present invention relates to a control logic means connectable to jitter buffer means adapted to receive and buffer incoming frames or packets and to extract data frames from the received packets, to decoding means connected to the jitter buffer means adapted to decode the extracted data frames, and to time scaling means adapted to play out decoded speech frames adaptively. The control logic means comprises further knowledge of whether a state recovery function is available and that the control logic means is adapted to retrieve at least one parameter from at least one of the jitter buffer means, the time scaling means, and the decoding means, to adaptively control at least one of an initial buffering time of said jitter buffer means based on the at least one parameter from the jitter buffer means and the knowledge of the availability of the state recovery function, and a time scaling amount of said time scaling means based on the at least one retrieved parameter from the time scaling means or the decoder and the knowledge of the availability of the state recovery function. The control logic means is preferably implemented in a receiver of a VoIP client.

The present invention also relates to a method. The method comprises the steps of:
1. Obtain knowledge of whether a state recovery function is available.
2. Retrieve at least one parameter from at least one of the jitter buffer means, the time scaling means, and the decoder to adaptively control at least one of an initial buffering time of said jitter buffer means based on the at least one parameter from the jitter buffer means and the knowledge of the availability of the state recovery function, and a time scaling amount of said time scaling means based on the at least one retrieved parameter from the time scaling means or the decoder and the knowledge of the availability of the state recovery function.

The method may be implemented by a computer program product. Such a computer program product may be directly loadable into a processing means in a computer, comprising the software code means for performing the steps of the method.

The computer program product may be stored on a computer usable medium, comprising readable program for causing a processing means in a computer, to control the execution of the steps of the method.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A control logic means connectable to jitter buffer means adapted to receive and buffer incoming frames or packets and to extract data frames from the received packets, to decoding means connected to the jitter buffer means adapted to decode the extracted data frames, to time scaling means adapted to play out decoded speech frames adaptively, the control logic means comprises means for obtaining knowledge of whether a state recovery function is available, means for retrieving at least one parameter from at least one of the jitter buffer means, the time scaling means, and the decoding means, means for adaptively controlling at least one of an initial buffering time of said jitter buffer means based on the at least one parameter from the jitter buffer means and the knowledge of the availability of the state recovery function, and, means for adaptively controlling a time scaling amount of said time scaling means based on the at least one retrieved parameter from the time scaling means or the decoder and the knowledge of the availability of the state recovery function.

2. The control logic means according to claim 1, wherein the retrieved parameter from the jitter buffer means relates to channel characteristics.

3. The control logic means according to claim 1, wherein the retrieved parameter from the decoding means relates to sound characteristics.

4. The control logic means according to claim 1, wherein the retrieved parameter from the time scaling means relates to at least one of sound characteristics, distortion information and achieved time scaling.

5. The control logic means according to claim 1, further comprising means for retrieving a further parameter relating to the CPU load and the adaptively controlling means adapted to further adaptively control at least one of an initial buffering time of said jitter buffer means, and a time scaling amount of said time scaling means based on the retrieved parameter.

6. The control logic means according to claim 1, further comprising means for retrieving information relating to the CPU load and means for adaptively controlling a state recovery means based on said CPU load related information.

7. The control logic means according to claim 6, wherein the retrieved information relating to the CPU load is associated with time scaling operations.

8. The control logic means according to claim 6, wherein the retrieved information relating to the CPU load is associated with time recovery operations.

9. The control logic means according to claim 6, wherein the state recovery means is adaptively enabled/disabled based on said CPU load related information.

10. The control logic means according to claim 6, wherein the state recovery is adaptively limited to a fewer number of parameters, or performed with a lower resolution based on said CPU load related information.

11. The control logic means according to claim 1, wherein the adaptively controlling means further adapted to adaptively control per frame basis at least one of the initial buffering time of said jitter buffer means, the time scaling amount of said time scaling means and a state recovery means.

12. A method for controlling a jitter buffer means adapted to receive and buffer incoming frames or packets and to extract data frames from the received packets, wherein a decoder is connected to the jitter buffer means adapted to decode the extracted data frames, and for controlling a time scaling means connected to the decoder adapted to play out decoded speech frames adaptively, the method comprises the steps of:
  obtaining knowledge of whether a state recovery function is available,
  retrieving at least one parameter from at least one of the jitter buffer means, the time scaling means, and the decoder, controlling adaptively at least one of an initial buffering time of said jitter buffer means based on the at least one parameter from the jitter buffer means and the knowledge of the availability of the state recovery function, and a time scaling amount of said time scaling means based on the at least one retrieved parameter from the time scaling. means or the decoder and the knowledge of the availability of the state recovery function.

13. The method according to claim 12, wherein the retrieved parameter from the jitter buffer means relates to channel characteristics.

14. The method according to claim 12, wherein the retrieved parameter from the decoder relates to sound characteristics.

15. The method according to claim 12, wherein the retrieved parameter from the time scaling means related to at least one of sound characteristics, distortion information and achieved time scaling.

16. The method according to claim 12, comprising the further step of:
   retrieving a further parameter relating to the CPU load and
   controlling adaptively at least one of an initial buffering time of said jitter buffer means, and a time scaling amount of said time scaling means based on the retrieved parameter.

17. The method according to claim 12, comprising the further step of:
   retrieving information relating to the CPU load and
   controlling adaptively the state recovery means based on said CPU load related information.

18. The method according to claim 17, wherein the retrieved information relating to the CPU load is associated with time scaling operations.

19. The method according to claim 17, wherein the retrieved information relating to the CPU load is associated with time recovery operations.

20. The method according to claim 17, wherein the state recovery means is adaptively enabled/disabled based on said CPU load related information.

21. The method according to claim 17, wherein the state recovery is adaptively limited to a fewer number of parameters, or performed with a lower resolution based on said CPU load related information.

22. The method according to claim 12, comprising the step of:
   controlling adaptively per frame basis at least one of an initial buffering time of said jitter buffer means, a time scaling amount of said time scaling means and the state recovery means.

23. A non-transitory computer-readable storage medium for storing an executable program within a receiver of a packet based communication system, comprising the software code portions for controlling a jitter buffer means adapted to receive and buffer incoming frames or packets and to extract data frames from the received packets, wherein a decoder is connected to the jitter buffer means adapted to decode the extracted data frames, and for controlling a time scaling means connected to the decoder adapted to play out decoded speech frames adaptively, by performing the following:
   obtaining knowledge of whether a state recovery function is available,
   retrieving at least one parameter from at least one of the jitter buffer means, the time scaling means, and the decoder,
   controlling adaptively at least one of an initial buffering time of said jitter buffer means based on the at least one parameter from the jitter buffer means and the knowledge of the availability of the state recovery function, and a time scaling amount of said time scaling means based on the at least one retrieved parameter from the time scaling means or the decoder and the knowledge of the availability of the state recovery function.

24. A non-transitory computer-readable storage medium for storing an executable program for causing a computer, within a receiver of a packet based communication system, to control a jitter buffer means adapted to receive and buffer incoming frames or packets and to extract data frames from the received packets, wherein a decoder is connected to the jitter buffer means adapted to decode the extracted data frames, and to control a time scaling means connected to the decoder adapted to play out decoded speech frames adaptively, by executing the following:
   obtaining knowledge of whether a state recovery function is available,
   retrieving at least one parameter from at least one of the jitter buffer means, the time scaling means, and the decoder,
   controlling adaptively at least one of an initial buffering time of said jitter buffer means based on the at least one parameter from the jitter buffer means and the knowledge of the availability of the state recovery function, and a time scaling amount of said time scaling means based on the at least one retrieved parameter from the time scaling means or the decoder and the knowledge of the availability of the state recovery function.

* * * * *